United States Patent
Zhang

(10) Patent No.: US 10,234,582 B2
(45) Date of Patent: Mar. 19, 2019

(54) JOINT INVERSION OF SEISMIC DATA

(71) Applicant: GEOTOMO LLC, Houston, TX (US)

(72) Inventor: Jie Zhang, Houston, TX (US)

(73) Assignee: GEOTOMO LLC, Houston, TX (US)

(*) Notice: Subject to any disclaimer, the term of this patent is extended or adjusted under 35 U.S.C. 154(b) by 333 days.

(21) Appl. No.: 15/088,235

(22) Filed: Apr. 1, 2016

(65) Prior Publication Data
US 2017/0115411 A1    Apr. 27, 2017

Related U.S. Application Data

(60) Provisional application No. 62/246,320, filed on Oct. 26, 2015.

(51) Int. Cl.
*G01V 1/28* (2006.01)
*G01V 1/30* (2006.01)

(52) U.S. Cl.
CPC ............ *G01V 1/282* (2013.01); *G01V 1/303* (2013.01); *G01V 2210/614* (2013.01); *G01V 2210/6222* (2013.01)

(58) Field of Classification Search
CPC .......... G01V 1/282; G01V 1/28; G01V 1/305; E21B 49/02
See application file for complete search history.

(56) References Cited

U.S. PATENT DOCUMENTS

2017/0242142 A1\* 8/2017 Jiao ..................... G01V 1/305

\* cited by examiner

*Primary Examiner* — Changhyun Yi
(74) *Attorney, Agent, or Firm* — Conley Rose PC

(57) ABSTRACT

A computer-implemented method of joint inversion of seismic data comprising receiving seismic data, selecting, by a computer system, a travel time data and waveform data, the selecting using the seismic data and generating a velocity model of a near-surface. The method comprises preparing parameters with which to update the velocity model by: calculating synthetic travel time data and synthetic waveform data; determining a travel time misfit gradient using the travel time data and synthetic travel time data; determining a wave-property misfit gradient based on the waveform data and the synthetic waveform data; calculating a join inversion gradient comprising the travel time misfit gradient and the wave-property misfit gradient; and estimating a step length. The method further comprises updating the velocity model using the step length and join inversion gradient; and repeating the preparing and updating steps until a travel time misfit and wave-property misfit reach a predetermined value.

19 Claims, 5 Drawing Sheets

JOINT INVERSION OF SEISMIC DATA

CROSS-REFERENCE TO RELATED APPLICATIONS

This application claims the benefit of provisional application Ser. No. 62/246,320 filed Oct. 26, 2015, titled "Joint Inversion of Seismic Data," which provisional application is incorporated by reference herein as if reproduced in full below.

BACKGROUND

The subsurface of the Earth may be surveyed for various reasons (e.g., in a search for specific substances such as oil and gas). Various geophysical surveying techniques may be used in the endeavor to survey the subsurface of the Earth. Geophysical surveying is a technique where multi-dimensional geophysical "pictures" of the state of subsurface or underground formations are taken with the use of energy (e.g., seismic, electromagnetic, etc.) that penetrates the subsurface formations. Geophysical surveying techniques continue to faces significant challenges due to the complex near-surface structures in the subsurface that are difficult to image.

BRIEF DESCRIPTION OF THE DRAWINGS

For a detailed description of various embodiments, reference will now be made to the accompanying drawings in which.

NOTATION AND NOMENCLATURE

Figure 1:
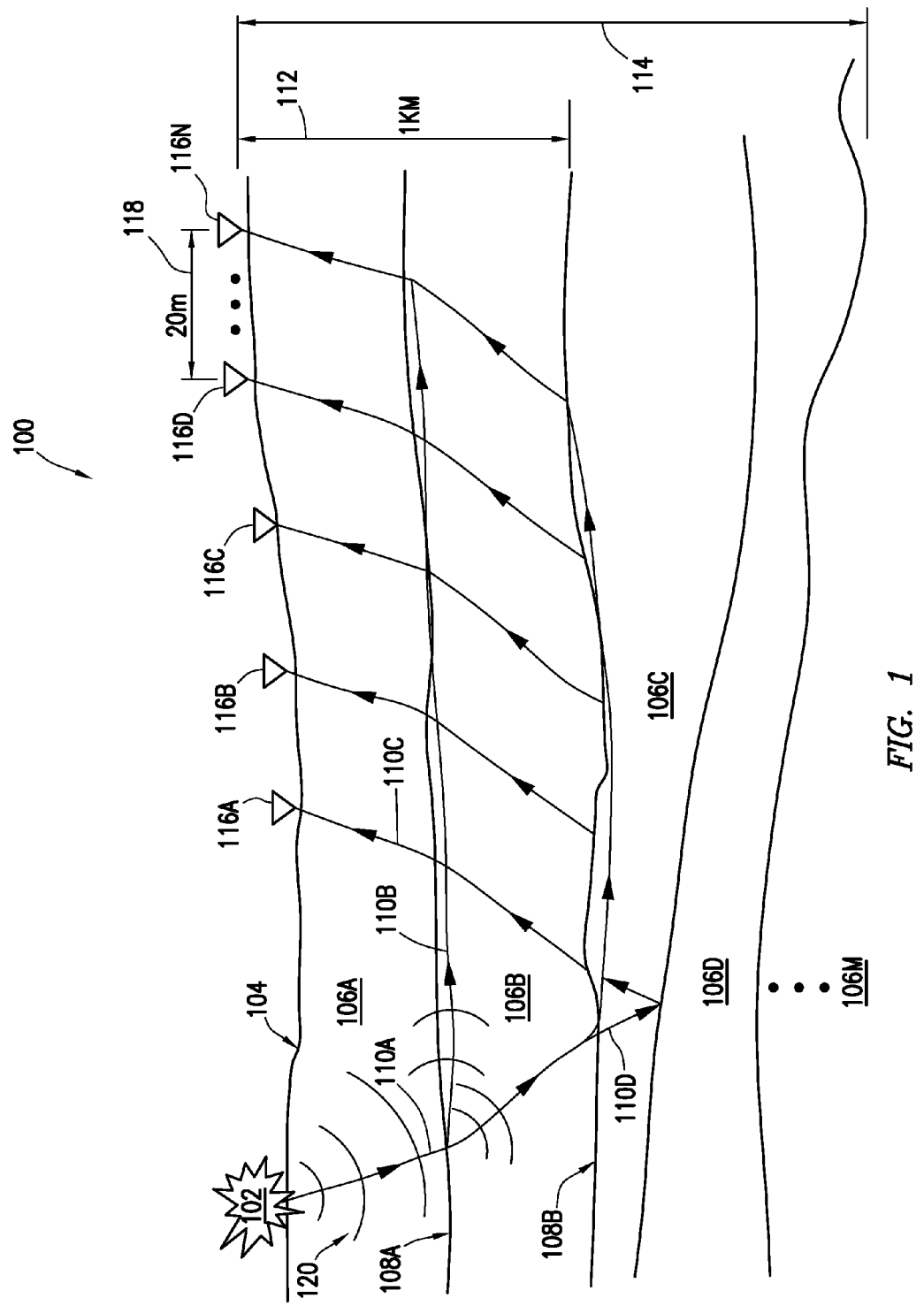
FIG. 1 shows a perspective cut-away view of an environment studied using geophysical surveying techniques in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Near-surface" shall mean the most shallow 1 kilometer of the subsurface.

"Seismic velocity" shall mean the velocity of propagation of elastic waves in an Earth formation.

"Velocity model" shall mean a model of a portion of the subsurface of the Earth represented by cells in a grid-like structure, where each cell represents a portion of the subsurface and a velocity with which a seismic wave travels through the portion of the subsurface represented by the cell.

"Inversion" shall refer to a process in which data are used to infer a geophysical model, such as a velocity model, that could have produced the data.

"Forward modeling" shall refer to a method, the results of which are to create a set of synthetic data.

"Back-propagate" shall refer to a method in which a velocity associated with a model cell in a velocity model is adjusted to account for a difference, observed at receivers, between an expected energy and actual energy of a waveform conceptually passed through the associated model cell in the velocity model.

"Misfit" shall mean a calculated difference between actual data and synthetic data.

"Shot" shall mean a single release of a seismic energy, e.g., a single blast of dynamite.

"Seismic data" shall mean data recorded by receivers responsive to seismic waves reflected off the Earth's subsurface.

"Joint gradient" shall mean a gradient determined by solving for at least two gradients in a single calculation, where each gradient is associated with a single type of data (e.g., waveform data or waveform envelope data).

"Joint inversion gradient" shall mean a gradient calculated by summing at least two gradients, where each gradient is associated with a single type of data or model (e.g., waveform data, travel-time data, and model regularization).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The ability to generate an accurate velocity model of the subsurface of the Earth may be beneficial to entities and individuals tasked with finding oil and gas reserves. The ability to accurately model the subsurface of the Earth relies on the ability to account for the complex structures along the near-surface. In order to deduce the complex structures of the near-surface, various example systems and methods are directed to the use of joint inversion of seismic data as described below.

FIG. 1 shows a perspective cut-away view of an environment 100 that may be studied using geophysical surveying techniques. Environment 100 may represent a terrestrial environment, such that surface 104 represents land. In other embodiments, environment 100 may represent a marine environment, in which surface 104 represents the bottom of a body of water such as an ocean or lake. Below the surface 104 resides subsurface 114 with formations of interest.

In particular, FIG. 1 shows a shot 102 at a surface 104 of the Earth. The near-surface 112 of the subsurface 114 of the Earth comprises example layers 106A and 106B. The remaining portion of subsurface 114 may comprise example layers 106C, 106D, . . . , 106M. Each of the layers 106A-M may have different densities and/or be made up of different mediums. A velocity of a seismic wave propagating through a respective layer, such as layer 106A may vary based on the density and medium of layer 106A. In various embodiments, boundaries, such as boundaries 108A and 108B, may be defined as locations in the subsurface that transition from one layer to another.

In various parts of the subsurface 114 of the Earth, the near-surface 112 may comprise structures that are difficult to image. The near-surface 112 may comprise more complex structures than remaining portions of the subsurface 114 due to the young geological age of the near-surface 112. For reasons discussed below, during a geophysical survey the complex near-surface structures present certain challenges to the process of modeling the subsurface 114.

Within the example environment of FIG. 1, during a geophysical survey, a shot 102 releases seismic energy which may initially propagate through subsurface 114 as depicted by raypath portion 110A. The seismic energy may propagate laterally through near-surface 112, as is depicted by raypath portion 110B. Portions of the seismic energy may travel back up through the near-surface 112, as depicted by raypath portion 110C. It will be understood that the seismic energy does not actually travel as rays along the raypaths; rather, the raypaths are a shorthand representation of the direction of travel of wavefronts 120 of seismic energy.

The example environment of FIG. 1 comprises receivers 116A, 116B, 116C, 116D, . . . , 116N that are appropriate for the geophysical survey, such geophones in the case of land-based geophysical surveys, or hydrophones in the case of marine geophysical surveys. The receivers 116A-N may be placed along the surface 104 at various increments. In example environment FIG. 1, receivers 116D and 116N are placed 20 meters apart. The receivers 116A-N detect seismic waves that are reflected back from the subsurface 114 and computer systems associated with the receivers store the data as seismic data. An example path of a seismic wave may be raypath 110C.

Aside from differences in density and medium, layers in the near-surface 112 may vary from other layers in the subsurface 114 due to the likelihood that the near-surface layers 106A and 106B comprise complex structures. For example, in the near-surface 112, a low velocity layer may be sandwiched between two hard rock layers, i.e., high velocity layers. Other approaches to geophysical surveying, such as time travel tomography alone, may not be able to resolve the low velocity layer sandwiched between two high velocity layers in the near-surface. These types of complex structures may vary significantly throughout the near-surface 112 such that structure of the near-surface 112 as determined at the location of a test well may not be indicative of the structure of the near-surface even a short distance from the test well.

Knowledge of the near-surface 112 structures is beneficial due to the impact the near-surface structures have on geophysical surveys. For example, seismic data received at receiver 116A travels initially through the near-surface 112 (e.g., raypath portion 110A), through portions of the subsurface 114 (e.g., raypath portion 110D), and back through the near-surface 112 (e.g., raypath portion 110C), prior to arriving at receiver 116A. Complex structures present in the near-surface 112 distort the seismic data regarding the deeper structures 106D, etc, which may hold hydrocarbons. In order to accurately model the subsurface 114, the ability to account for the distortions in the seismic data caused by the structures present in the near-surface 112 is beneficial as this knowledge impacts the ability to accurately image the deeper sub-surface 114 structures.

Figure 2:
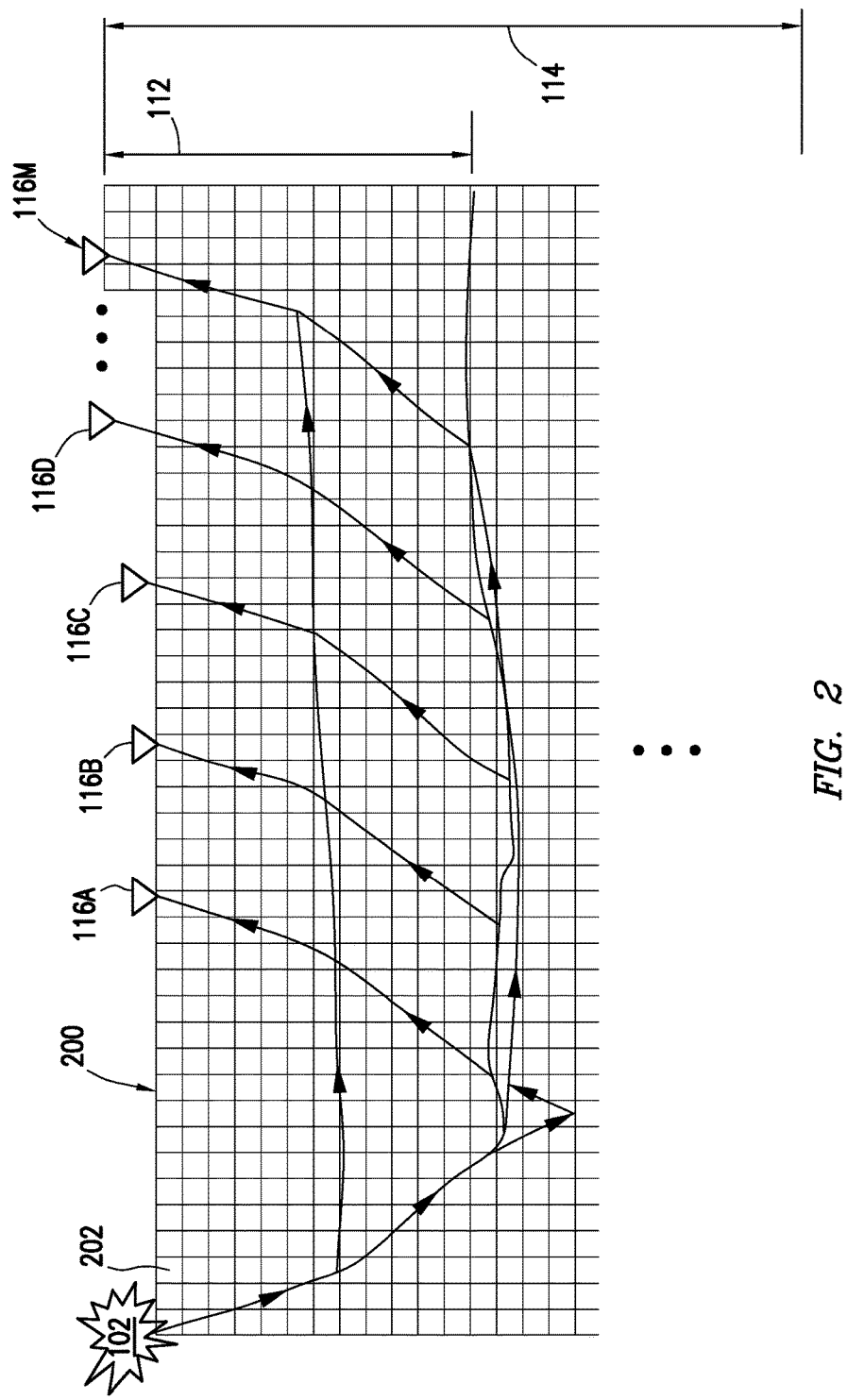
FIG. 2 shows a conceptual cut-away elevation view of a velocity model produced in accordance with at least some embodiments.

FIG. 2 depicts a conceptual cut-away elevation view of a velocity model produced in accordance with at least some embodiments. Overlayed on the velocity model are the example raypaths of FIG. 1. As the structures in a near-surface layer may vary greatly, a velocity of a seismic wave traveling within a layer of the near-surface does not stay the same throughout the respective near-surface layer. Thus, a velocity model 200 as depicted in FIG. 2 comprises grid-like cells which represent divisions of the subsurface 114.

In the velocity model, each cell (such as cell 202) represents a volume of earth and contains a value that represents a certain velocity value within the volume of earth. The higher the number of cells representing a certain area of the subsurface 114, the higher the resolution of the model and the higher the accuracy. Interfaces in the layers, such as interface 108A (FIG. 1, not expressly shown in FIG. 2) may be represented in the velocity model as a high contrast in velocity as between adjacent cells.

Although the velocity model 200 and subsurface 114 are depicted as two dimensional in FIG. 2, in practice the velocity model is three-dimensional. Thus, an example interface 108A shown as a line in FIG. 1 may be a plane.

In the related-art, various methods may be used to generate velocity model 200 for a particular subsurface including the near-surface of the Earth. For example, some methods include travel time methods, waveform inversion methods, and waveform envelope inversion methods. These methods are applied individually in efforts to deduce an accurate velocity model 200 of the near-surface 112.

Travel time methods may entail using picked first-arrival travel times from seismic data, where the picked first-arrival travel times are times at which seismic waves first arrive at a receiver, such as receiver 116A. Thus for example, the term travel time refers to the time it takes a seismic wave to travel from the location of the shot 102, into subsurface 112, reach a reflecting boundary, such as interface 108A, and return to the surface 104. Through the use of a method known in the art called time picking, one may obtain the exact travel time of a seismic wave from the seismic data. Travel time methods are unable to accurately resolve complex structures in the near-surface 112, such as a hidden low velocity layer sandwiched between two high velocity layers.

Waveform inversion methods entail extracting early-arrival waveform data from the seismic data (the early-arrival waveform data representative of the near-surface 112). Waveforms include more detailed information, thus waveform inversion methods may be able to resolve complex structures more accurately than travel time methods. However, in order for waveform inversion to be effective, low-frequency data or a close starting velocity model is needed in the related art. In other words, if a starting velocity model, i.e., a velocity model capturing a guess of the near-surface structures, does not sufficiently match the actual near-surface structure, waveform inversion may be extremely difficult if not impossible to perform. However, generating a starting velocity model that is close to the actual near-surface is difficult. After all, one of the goals in performing a geophysical survey may be to deduce the actual near-surface structures, which are unknown. Additionally, related-art methods for acquiring seismic data do not record low frequency data.

Many efforts are underway to develop waveform inversion methods that can address issues faced in applying waveform inversion methods. One method includes waveform envelope inversion. In one example of such an approach, an envelope operator may be applied to extract envelopes of the early-arrival waveform data. To apply a waveform envelope inversion a two step method may be applied in which first, a waveform envelope inversion is performed using the velocity model and next, a waveform inversion is performed using the velocity model. However, this approach is computationally intensive and time consuming. For example, each step in the two step method may take days to perform for solving a 3D problem.

The three approaches mentioned above might by analogized to three different types of drugs present in the current field, each proposed as an imperfect solution for curing the difficulties faced in attempts to accurately map near-surface velocity structures. The problems noted above are addressed, at least in part, by performing a joint inversion of at least two types of data and in one case, three types of data. Continuing the above analogy, the proposed solution entails combining two and sometimes three drugs into one. However, the solution is not as simple as summing up the effects of the individual drugs because each drug interacts and affects the efficacy of the others. One of ordinary skill in the art may refrain from attempting such an approach because at first blush, the computation time for such an approach may appear to be doubled or tripled.

Figure 3:
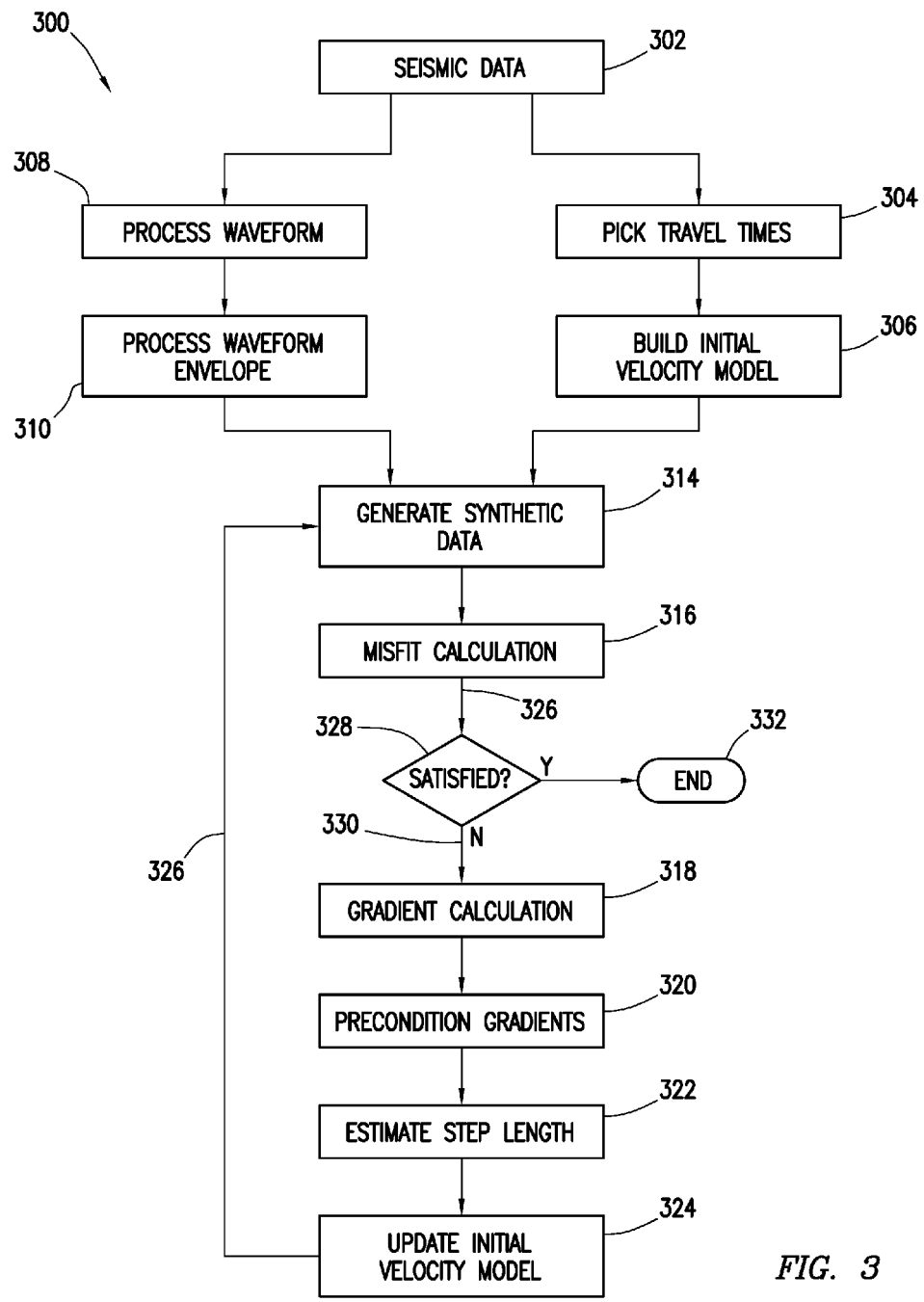
FIG. 3 shows a flow diagram of a method for updating a velocity model in accordance with at least some embodiments.

FIG. 3 shows an example method in accordance with at least some embodiments for performing a joint inversion. The method updates a velocity model, such as velocity model 200, to more accurately reflect the near-surface structures of the area being surveyed. In various embodiments, some of the blocks shown in FIG. 3 may be performed concurrently, in a different order than shown, or omitted. Additional method elements may be performed as desired.

Initially, seismic data may be obtained (block 302). As discussed previously, seismic data may be obtained by receivers 116. Using the seismic data, travel times may be picked (block 304). As discussed previously, travel times are picked from the seismic data according to when seismic waves first arrive at the receivers 116 (e.g., first arrivals). Using the travel times, an initial velocity model may be generated or built using refraction theories (block 306). In other embodiments, the initial velocity model may originate from any other model estimated from geology or other data (such as data gathered by previous geophysical surveys in the same or areas of similar geology, and/or by data from test wells).

As discussed with respect to FIG. 2, the velocity model may be considered to encompass a volume of the Earth at the near-surface, where the volume of the Earth is conceptually divided into a plurality of smaller three-dimensional cubes (FIG. 2 shows the cubes as a grid of squares), and where each cube is associated with the seismic velocity. The initial velocity model may be referred to as a "one-dimensional model," meaning the model initially comprises a plurality of flat layers.

The seismic data are also processed to select waveform data (block 308). In various embodiments, selecting the waveform data may entail defining a time window that selects the early arrivals of seismic waveforms. The process of defining a time window from within which waveform data is selected may be referred to as windowing the seismic data. Accordingly, a time window may be defined within which the waveform data is selected from. The early arrivals of the seismic waveforms are associated with the near-surface velocity structures. The time window ensures that the waveforms are associated only or substantially only with the near surface velocity structures. In some examples, seismic waves associated with layers beneath the near-surface may take 14 seconds or more (from the time of the shot 102) to reach the receivers. By contrast, seismic waves associated with the near-surface may return in a window of 200 to 500 milliseconds after the first arrivals.

Selecting the waveform data may be thus accomplished by an application of muting functions to reduce the data outside the defined time window. For example, a first muting function may be applied that removes any detected signals occurring before the beginning of the defined time window. A second muting function may be applied to remove signals detected after the end of the defined time window. Additionally, in some example embodiments a taper function may be applied to remove frequency components created in abrupt cut-offs at either side of the defined time window. Additional methods may include applying a bandpass filter to remove noise. After the various windowing, tapering, and noise filtering techniques are applied (i.e., block 308), the resulting early-arrival waveform may be defined as a function, d(t).

Still referring to FIG. 3, in the next step in the example method, the waveform envelopes may be processed from the early-arrival waveforms to generate additional waveform envelope data (block 310). For each early-arrival waveform, a waveform envelope may be extracted through the use of a two step approach including first applying an analytic Hilbert transform of the early-arrival waveform such that:

$$d_a(t)=d(t)+iH(d(t)) \quad (1)$$

where da(t) is the analytic Hilbert transform for an early-arrival waveform d(t), the analytic Hilbert transform comprising a real part d(t) and an imaginary part H(d(t)) where H represents the Hilbert transform. Next a magnitude of the analytic signal is taken to form waveform envelope data:

$$d_H(t)=|d_a(t)|=\text{sqrt}\{[Re(d_a(t)]^2+[Im(d_a(t)]^2\} \quad (2)$$

where $d_H(t)$ represents the waveform envelope.

In the next step in the example method, synthetic data is generated (block 314). That is, given the initial velocity model (generated at block 306), synthetic travel times, synthetic waveforms, and synthetic waveform envelopes of the synthetic waveforms may be created. Creating the synthetic travel times may entail applying ray tracing approaches to calculate theoretical travel times for a given geometry and velocity model, such as the initial velocity model. Such calculations may output two results: travel time at all receivers, and the raypaths between all shot and receiver pairs. Raypaths may be viewed as travel time derivatives with respect to the velocity model parameters.

Creating the synthetic waveforms may entail calculating theoretical early-arrival waveforms for a given geometry and velocity model, such as the initial velocity model. In several examples, the theoretical early-arrival waveforms may be processed with muting functions, bandpass functions, and tapers similar to the functions and techniques discussed with regards to processing early-arrivals waveforms from seismic data (block 308). Each calculated synthetic early-arrival waveform may be defined as a function, s(t).

Creating the synthetic waveform envelopes may entail procedures similar to those discussed with regards to processing waveform envelopes (block 310). That is, the synthetic waveform envelopes may be extracted through the use of the two step approach including first applying a Hilbert transform to each synthetic early-arrival waveform and next taking a magnitude of the analytical signal to form a synthetic waveform envelope data, $s_H(t)$. Thus three types of synthetic data may be calculated including synthetic travel times, synthetic (early-arrival) waveforms, and corresponding synthetic waveform envelopes of the early-arrival waveforms.

Next, misfits are calculated as an indication of differences between the different types of synthetic data and actual data (block 316). In some examples, a least squares misfit (hereinafter "L2 misfit") approach may be used. Thus an L2 misfit may be calculated between the travel times picked from seismic data (e.g., during block 304), and the synthetic travel times (e.g., block 314) to obtain a travel time misfit.

Additionally, misfits may be calculated between actual and synthetic waveform data as well as between the actual and synthetic waveform envelopes. For example, to obtain an early-arrival waveform misfit value, an L2 misfit may be calculated between the synthetic waveforms s(t) and the actual early-arrival waveforms d(t), calculated in block 308. Similarly, the L2 misfit may be calculated between the synthetic waveform envelopes $s_H(t)$ and the actual waveform envelopes $d_H(t)$, calculated in block 310.

Note that the inversion process discussed below is simultaneous across two or three types of data. Although misfits are calculated at block 316 for the different types of data, attempts are not made to adjust the initial velocity model based on a single misfit calculation alone. For example, attempts are not made to adjust the initial velocity model based on travel time misfits alone. Rather, the individual misfit calculations are processed together to arrive at a single update to the velocity model.

In accordance with example methods, an objective function may be calculated to quantify the total misfits across the different types of data. An inversion approach is designed to reduce the actual data and synthetic data misfits so that the final velocity model represents the true Earth if the misfits are close to zero. More particularly, in example embodiments a joint inversion approach is implemented to reduce an objective function, such as:

$$\Phi = \|T - T_c\|^2 + \alpha \|d(t) - s(t)\|^2 + \beta \|e(t) - s_H(t)\|^2 \qquad (3)$$

where T represents travel times picked from seismic data in block 304, Tc represents the synthetic travel times, d(t) represents early-arrival waveforms processed from the seismic data in block 308, s(t) represents the synthetic early-arrival waveforms, e(t) represents waveform envelope data processed from seismic data (in block 310), sH(t) represents the synthetic waveform envelope data, α is a scaling factor for the early-arrival waveform misfit, and β is the scaling factor for the waveform envelope misfit.

In various embodiments, when a joint inversion is applied in an update to the velocity model, if α=0 and β is a non-zero value, then the joint inversion process entails a joint travel time and waveform envelope inversion. Alternatively, if β=0 and α is a non-zero value, then the joint inversion process entails a joint travel time and waveform inversion.

In a next step in the example methods, the misfits are assessed against a predefined threshold (block 328). That is, if the misfits are greater than the predefined threshold, the velocity model does not yet adequately represent the near-surface structure, and thus the example moves to gradient calculations (block 318, and discussed more below). If, however, the misfits meet or are less than the predefined threshold (again block 328), then the example methods ends (block 332). The chances that the velocity model will adequately represent the near-surface structure the first time through the example method of FIG. 3 are very small. It may take many iterations through the example method to achieve a velocity model such that the misfits are sufficiently small to consider the model correct.

Assuming the misfits are still greater than the predetermined threshold (again block 328), a gradient of the data misfits is determined which indicates the direction each cell in the velocity model will need to be updated (block 318). At a high level, gradients for each of the data misfits may be combined to determine a joint inversion gradient. Thus, in some embodiments, g=g1+g2+g3, where g represent a joint inversion gradient, g1 represents the travel time misfit gradient, g2 represents the early-arrival waveform misfit gradients and g3 represents the waveform envelope misfit gradient. The specification now turns to a description of the various misfit calculations for each type of data.

In various embodiments, the travel time misfit gradient (i.e., g1), may be calculated using the equation:

$$g_1 = A^T(T - T_c(m)) \qquad (4)$$

where AT is the transpose of the sensitivity (derivative) matrix of travel times and m represents the current velocity model.

In several examples, a wave-property misfit gradient may comprise combined calculations of the waveform and waveform envelope gradients or gradient calculations of one but not the other. In one example, to solve for the joint gradient g2+g3, an effective residual may be placed at each receiver in the velocity model and back-propagated through the velocity model. In other words, the effective residual is placed at each receiver and then calculations are performed to determine how much the velocity within the cells needs to be changed in order to reduce or eliminate the effective residual. In example methods, the residual magnitude may be defined as:

$$\alpha(d(t) - s(t)) + \beta(E \, s(t) - H(Es_H(t))) \qquad (5)$$

where, d(t) represents the waveform data processed from seismic data, s(t) represents the synthetic waveform, $s_H(t)$ represents the synthetic waveform envelope, α represents the scaling factor for the waveform residual, β represents the scaling factor for the envelope residual, and E is the envelope residual given by:

$$E = \sqrt{s^2(t) + s_H^2(t)} - \sqrt{d^2(t) + d_H^2(t)} \qquad (6)$$

with the remaining terms as defined above.

The example method for calculating a joint gradient provides a computationally efficient method for calculating both gradients simultaneously. Due to the calculation being performed simultaneously, it does not double the time needed to calculate both gradients. For example, this method for calculating a joint gradient takes nearly the same amount of time to compute as the time needed to compute the waveform gradient (g2) alone.

Next, a Laplacian operator may be applied to model parameters for regularization. An L2 norm of the smoothing result from the application of the Laplacian operator may be reduced or minimized in the objective function. Regularization refers to a method for ensuring that connectivity between adjacent velocity model cells is continuous. The regularization scheme is a process to manage velocity model cells and ensure a stable inversion solution. Additionally, a scaling factor may be applied to weight the smoothing result quantity in the objective function. Alternatively, according to methods known in the art, a total-variation regularization scheme may be applied, which preserves sharp interfaces in piece-wise constant structures.

In various embodiments, the regularization procedures may be modified with a priori information about the near surfaces. Thus, in some examples, a model vector may be replaced with model vector difference between the new velocity model and an a priori model. This approach may result in constraining cells in the velocity model at the location of the a priori information, but may not make assumptions about how far out the information remains valid. An a priori model may include known velocity interface information, and/or known well-log or uphole velocity interpretation.

Continuing the discussion of block 318, a joint inversion gradient is calculated as the sum of the individual gradients calculated above along with the gradients of the model regularization. That is, the joint inversion gradient is calculated by summing the travel time misfit gradients, the early-arrival waveform misfit gradient, waveform envelope gradient, and the gradients of the model regularization.

Next, a preconditioner may be applied to the joint inversion gradient to generate a preconditioned gradient (block 320). A preconditioned gradient may reduce the number of model update iterations needed before reaching the final model updates, because a preconditioned gradient is closer to the true gradient.

Some assumptions are made, in several examples, to develop the preconditioner that may be applied to the joint inversion gradient. For example, assumptions may be made that travel time and waveforms are close in terms of raypath and coverage. Thus, by borrowing travel time information, the following preconditioner may be applied:

$$P=(A^TA+\tau R^TR+\varepsilon_K I)^{-1} \qquad (7)$$

where A represents the travel time sensitivity matrix, AT represents the transpose of the travel time sensitivity matrix, R represents the model regularization operator, $\tau$ is the scaling factor for regularization, and $\varepsilon k$ is a scaling factor proportional to the travel time misfit. The preconditioner is constructed by the travel time first order derivatives and the preconditioner approximates the inverse of the travel-time sensitive matrix.

In several examples, the conjugate gradient method is iterated to calculate the inverse matrix to prepare the preconditioner. As the matrix A contains many elements that are zero, a method may be utilized where the non-zero elements of the matrix A are stored and the conjugate gradient method iterated.

Next, a step length is estimated by performing a few forward modeling problems to determine a step length with which to update the velocity model. In some examples, a few shots may be chosen to calculate the travel time and waveform to test the step length in the model update. The step length determines the magnitude of the correction indicated by the joint inversion gradient.

Next, the velocity model is updated based on the joint inversion gradient and the step length (block 324). The updates are performed to create a new velocity model, and the method 300 proceeds through 326 where new synthetic data is calculated based on the new velocity model. Blocks 314-324 may be performed iteratively until during a misfit calculation, a predetermined threshold is satisfied. For example, after calculating misfits, the method 300 proceeds through 326 to decision block 328. At decision block 328, if calculated misfits, for all types are data, are below the predetermined threshold, then method 300 proceeds to the end block 332, otherwise the method 300 proceeds through 330 to block 318 where a joint inversion gradient is calculated.

In various embodiments, after the velocity model is updated, misfits for travel times, early-arrival waveforms, and waveform envelopes may be output and plotted for each iteration. This may be done for quality control. Additionally, the total objective function value against the respective iteration number is also plotted for quality control. The gradients of the objective functions may also be outputted for quality control.

Figure 4:
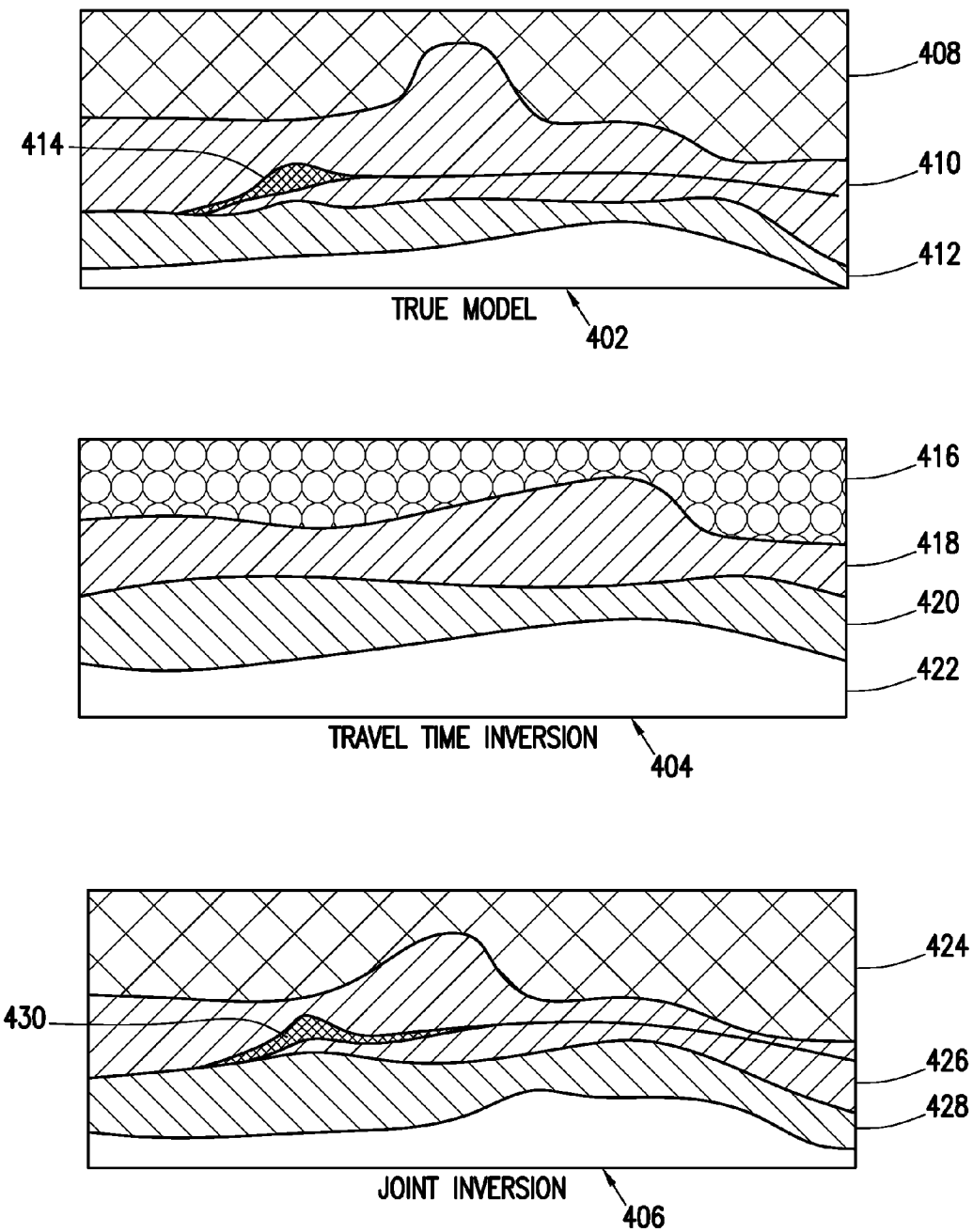
FIG. 4 shows various aspects of a velocity model in accordance with several embodiments.

In FIG. 4, the effects of travel time inversion and joint inversion are shown in models 404 and 406. In model 402, a true model is shown reflecting the near-surface structures. A layer 408 may have a different velocity value from layers 410 and 412. As shown, when travel time inversion is applied to an initial velocity value, the results (model 404) do not accurately reflect the structures of true model 402. For example, model 404 is unable to resolve the structure 414 within layer 410 of the true model 402. Additionally, the velocity value of layer 416 may not accurately reflect the true velocity value (e.g., velocity value in layer 408 in the true model). A method applied in accordance with aspects of method 300, as shown in model 406, may be able to resolve the structures and interfaces between the layers better than the travel time inversion approach. For example, the model 406 may be able to resolve a structure 430 sandwiched between a high velocity layer 426.

Figure 5:
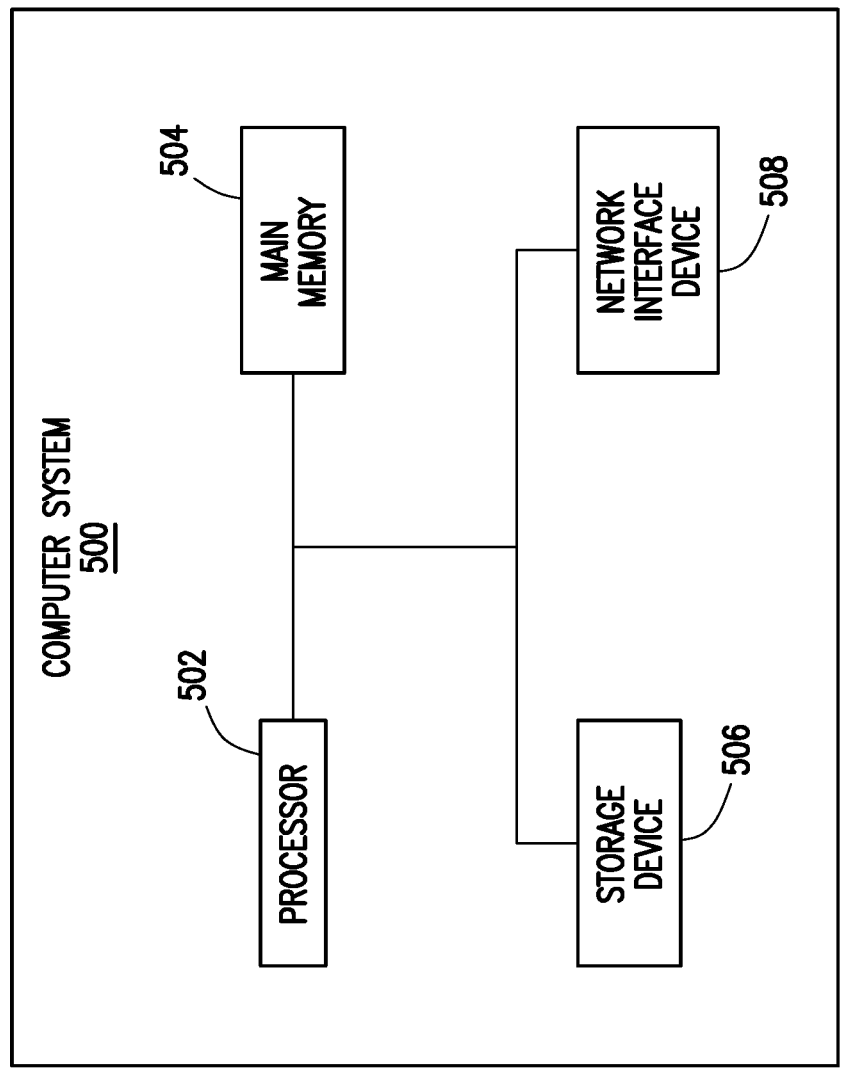
FIG. 5 shows, in block diagram form, a computer system in accordance with at least some embodiments.

FIG. 5, shows a computer system 500 which is illustrative of a computer system that may perform method steps in accordance with method 300. The computer system 500 may be illustrative of, for example, a laptop, a desktop computer, a computer within a node of several computers, or any other computing system that may be connected to a network of computers. The computer system 500 comprises a processor 502, and a main memory 504 coupled to processor 502. Additionally, processor 502 and main memory 504 may be coupled to storage device 506, and a network interface device 508.

Programs executable by the processor 502 may be stored on the storage device 506 (e.g., a hard drive, solid state disk, memory stick, optical disc), and accessed when needed by the processor 502. Programs stored on the storage device 506 may comprise programs to implement various processes on the computer system 500, including method steps in accordance with method 300 discussed above. In some cases, the programs are copied from the storage device 506 to the main memory 504, and the programs are executed from the main memory 504. Thus, both the main memory 504 and storage device 506 shall be considered computer-readable storage mediums.

In various embodiments, network interface device 508 may allow computer system 500 to exchange data over a wireless or wired network. In some embodiments the computer system 500 may be connected to a plurality of other computers within a shared network. Thus, while many aspects of the method 300 may be performed serially, various embodiments enable parallel processing to speed up the overall processing time. Forward ray tracing and waveform modelling for shots may comprise major computations elements, however these procedures may be performed in parallel processes. Additionally, the conjugate gradient approach may be performed in a parallel manner such that intermediate results are only stored locally, and need not be communicated among different computing nodes.

From the description provided herein, those skilled in the art are readily able to combine software with appropriate general-purpose or special-purpose computer hardware to create a computer system and/or computer sub-components in accordance with the various embodiments and methods, for example, as discussed with regards to method 300.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment or example.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of joint inversion of seismic data, the method comprising:
   receiving seismic data;
   selecting, by a computer system, a travel time data and waveform data, the selecting using the seismic data;
   generating a velocity model of a near-surface;
   calculating envelope data based on the waveform data;
   preparing parameters with which to update the velocity model by:
     calculating synthetic travel time data and synthetic waveform data using the velocity model;
     determining a travel time misfit gradient using the travel time data and synthetic travel time data;
     calculating synthetic envelope data based on the synthetic waveform data;
     calculating an envelope residual based on a difference between the envelope data and the synthetic envelope data;
     determining a wave-property misfit gradient based on a back-propagation of the envelope residual through the velocity model;
     calculating a joint inversion gradient comprising the travel time misfit gradient and the wave-property misfit gradient; and
     estimating a step length; and
   updating the velocity model using the step length and joint inversion gradient; and
   repeating the preparing and updating steps until a travel time misfit and a wave-property misfit reach a predetermined value.

2. The computer-implemented method of claim 1 wherein determining the wave-property misfit gradient further comprises determining a waveform misfit gradient using the waveform data and the synthetic waveform data.

3. The computer-implemented method of claim 2 wherein determining the waveform misfit gradient further comprises:
   calculating a waveform residual being a difference between the waveform data and the synthetic waveform data; and then
   back-propagating the waveform residual through the velocity model; and
   determining the waveform misfit gradient based on changes to the velocity model identified by the back-propagation.

4. The computer-implemented method of claim 1 wherein determining the wave-property misfit gradient includes determining an envelope misfit gradient based on changes to the velocity model identified by the back-propagation.

5. The computer-implemented method of claim 4 wherein determining the wave-property misfit gradient further comprises simultaneously determining a waveform misfit gradient and the envelope misfit gradient, the simultaneously determining using the waveform data, the synthetic waveform data, the envelope data, and the synthetic envelope data.

6. The computer-implemented method of claim 5 wherein determining the wave-property misfit gradient further comprises:
   calculating a waveform residual being a difference between the waveform data and the synthetic waveform data;
   simultaneously back-propagating the waveform residual and the envelope residual through the velocity model; and
   determining the wave-property misfit gradient based on changes to the velocity model identified by the back-propagation.

7. The computer-implemented method of claim 1, wherein the joint inversion gradient is preconditioned with a preconditioner:

$$P=(A^T A+\tau R^T R+\varepsilon_K I)^{-1}$$

wherein A comprises a travel-time sensitivity matrix, AT comprises a transpose of the sensitivity matrix, R comprises a model regularization operator, $\tau$ comprises a scaling factor for regularization, $\varepsilon k$ comprises a scaling factor proportional to a travel time misfit, and I comprises an identity matrix.

8. The computer-implemented method of claim 1, wherein selecting the waveform data further comprises windowing, by the computer system, the seismic data.

9. A computer system comprising:
   a processor;
   a memory coupled to the processor;
   the memory stores a program that, when executed by the processor, causes the processor to:
     receive seismic data;
     select a travel time data and waveform data, the selection using the seismic data;
     generate a velocity model of a near-surface;
     prepare parameters with which to update the velocity model, wherein the program, when executed by the processor, further causes the processor to:
       calculate synthetic travel time data and synthetic waveform data using the initial velocity model;
       determine a travel time misfit gradient using the travel time data and synthetic travel time data;
       calculate a waveform residual based on a difference between the waveform data and the synthetic waveform data;
       determine a wave-property misfit gradient based on a back-propagation of the waveform residual through the velocity model;
       calculate a joint inversion gradient comprising the travel time misfit gradient and the wave-property misfit gradient; and
       estimate a step length; and
     update the velocity model using the step length and joint inversion gradient; and
     repeat the prepare and update steps until a travel time misfit and a wave-property misfit reach a predetermined value.

10. The computer system of claim 9 wherein determine the wave-property misfit gradient further comprises determine a waveform misfit gradient using the waveform data and the synthetic waveform data.

11. The computer system of claim 10 wherein determine the waveform misfit gradient is based on changes to the velocity model identified by the back-propagation.

12. The computer system of claim 9, the program, when executed by the processor, further causes the processor to:

calculate, by the computer system, envelope data using the waveform data;

wherein prepare parameters further comprises calculate a set of synthetic envelope data using the synthetic waveform data;

wherein determine the wave-property misfit gradient further comprises determine an envelope misfit gradient using the envelope data and the synthetic envelope data.

13. The computer system of claim 12 wherein determine the envelope misfit gradient further comprises:

calculate an envelope residual comprising a difference between the envelope data and the synthetic envelope data; and then back-propagate the envelope residual through the velocity model; and determine the envelope misfit gradient based on changes to the velocity model identified by the back-propagation.

14. The computer system of claim 12 wherein determine the wave-property misfit gradient further comprises determine, simultaneously, a waveform misfit gradient and the envelope misfit gradient, wherein the determine simultaneously uses the waveform data, the synthetic waveform data, the envelope data, and the synthetic envelope data.

15. The computer system of claim 14 wherein determine the wave-property misfit gradient further comprises:

calculate an envelope residual comprising a difference between the envelope data and the synthetic envelope data; and then back-propagate, simultaneously, the waveform residual and the envelope residual through the velocity model; and determine the wave-property misfit gradient based on changes to the velocity model identified by the back-propagation.

16. The computer system of claim 9, wherein the joint inversion gradient is preconditioned with a preconditioner:

$$P=(A^TA+\tau R^TR+\varepsilon_K I)^{-1}$$

wherein A comprises a travel-time sensitivity matrix, AT comprises a transpose of the sensitivity matrix, R comprises a model regularization operator, $\tau$ comprises a scaling factor for regularization, $\varepsilon k$ comprises a scaling factor proportional to a travel time misfit, and I comprises an identity matrix.

17. The computer system of claim 9, wherein select the waveform data further comprises apply a window to the seismic data.

18. A computer system comprising:

a processor;

a memory coupled to the processor;

the memory stores a program that, when executed by the processor, causes the processor to:

receive seismic data of a near-surface;

select a travel time data and waveform data, the selection using the seismic data;

calculate a set of envelope data using the waveform data;

generate a velocity model of the near-surface;

prepare parameters with which to update the velocity model, wherein the program, when executed by the processor, further causes the processor to:

calculate synthetic travel time data and synthetic waveform data using the initial velocity model;

calculate a set of synthetic envelope data using the synthetic waveform data;

determine a travel time misfit gradient using the travel time data and synthetic travel time data;

determine a wave-property misfit gradient, including calculating a waveform residual based on a difference between the waveform data and the synthetic waveform data, calculating an envelope residual based on a difference between the envelope data and the synthetic envelope data, and back-propagating the waveform residual and the envelope residual through the velocity model;

calculate a joint inversion gradient comprising the travel time misfit gradient and the wave-property misfit gradient; and estimate a step length; and update the velocity module using the step length and joint inversion gradient; and repeat the prepare and update steps until a travel time misfit and wave-property misfit reach a predetermined value.

19. The computer system of claim 18 wherein the back-propagation of the waveform residual and the envelope residual is simultaneous, and determine the wave-property misfit gradient is based on changes to the velocity model identified by the back-propagation.

* * * * *